US005765971A

United States Patent [19]
Rutz

[11] Patent Number: 5,765,971
[45] Date of Patent: Jun. 16, 1998

[54] COATING POWDER FEED DEVICE

[75] Inventor: Guido Rutz, Gossau, Switzerland

[73] Assignee: Gema Volstatic AG, Switzerland

[21] Appl. No.: 718,879

[22] Filed: Sep. 24, 1996

[30] Foreign Application Priority Data

Oct. 19, 1995 [DE] Germany ........................ 195 38 926.3

[51] Int. Cl.[6] ........................ B65G 53/14
[52] U.S. Cl. ........................ 406/123; 406/93; 406/143
[58] Field of Search ........................ 406/93, 123, 141, 406/142, 143, 151, 152, 153

[56] References Cited

U.S. PATENT DOCUMENTS

| | | | |
|---|---|---|---|
| 3,826,540 | 7/1974 | Jensen | 406/123 |
| 3,863,808 | 2/1975 | Vertue | 406/153 |
| 5,140,935 | 8/1992 | Gruber | 118/621 |

FOREIGN PATENT DOCUMENTS

| | | |
|---|---|---|
| 1005413 | 3/1957 | Germany . |
| 9105321.8 | 8/1991 | Germany . |
| 4013061 | 11/1991 | Germany . |
| 4021674 | 1/1992 | Germany . |
| 4415828 | 6/1995 | Germany . |

*Primary Examiner*—Andrew C. Pike
*Attorney, Agent, or Firm*—MacMillan, Sobanski & Todd

[57] ABSTRACT

A coating powder feed device supplies a plurality of flows of coating powder from a container to, for example, a plurality of powder coating devices or a plurality of containers. A plurality of individual powder feed devices are mounted in a housing which is sealed against entry of coating powder. Only the exterior housing surfaces, intake heads at lower ends of the individual powder feed devices which include powder suction inlets, and the internal fluidized powder flow channels are exposed to the coating powder, thus facilitating cleaning when changing powders. The individual powder feed devices are simultaneously lowered into a powder supply container during use.

5 Claims, 2 Drawing Sheets

COATING POWDER FEED DEVICE

TECHNICAL FIELD

The invention relates to powder coating and more particularly to a coating powder feed device for delivering a fluidized flow of coating powder to, for example, a plurality of powder spray guns or to one or more other powder containers.

BACKGROUND ART

Powder coating devices are well known in the art. Powder in a container is pneumatically suctioned off and fluidized by a flow of air in a powder feed device. The fluidized powder is then carried through a tube to a powder applicator, such as a spray gun or other spray device. The container from which the powder is pneumatically suctioned off may be the container in which the powder is shipped by the powder manufacturer to the powder user. Or, the powder may be withdrawn from another storage container for delivery to a powder spray device. The fluidized powder is applied to articles to be coated and the powder is then exposed to heat and fused onto the article. For feeding powder from a single container to several spray devices, it is desirable to immerse several powder feed devices simultaneously in the powder supply container so that a separate powder feed device supplies powder to each spray device.

Changing the powder type (color change) requires very thorough cleaning not only of the powder lines, but also of the exterior and interior of the powder feed devices. The powder feed devices must be cleaned on their outsides as well as on the inside powder flow channels so as not to contaminate the new powder with particles of the powder used before. The powder feed devices may have an irregular exterior shape which can accumulate powder during use and require extra care in cleaning.

SUMMARY OF INVENTION

The objective underlying the invention is to simplify the simultaneous use of several powder feed devices in one and the same container while at the same time reducing the time needed to clean the devices for a color change.

According to the invention, a number of powder feed device are simultaneously immersed in a powder supply container. The powder feed devices are mounted together in a housing which is sealed to prevent entry of the powder. The housing has a smooth exterior which minimizes buildup of powder and is easily cleaned. Only the suction inlets and the internal powder feed passages of the individual powder feed devices are exposed to the powder during use. The limited exposure of the individual powder feed devices to the powder facilitates cleaning when changing powder types and/or color. The powder feed devices are simultaneously immersed in the powder either by their deadweight or manually or by a guide device or a reciprocator, in order to draw powder from the container. The powder feed devices are able to pneumatically feed the suctioned powder either to a plurality of spray devices or to one or more other containers or to other points.

Accordingly, it is an object of the invention to provide an improved powder feed device for delivering a plurality of flows of fluidized coating powder from a powder container.

Other objects and advantages of the invention will become apparent from the following detailed description of the invention and the accompanying drawings.

BEST MODE FOR CARRYING OUT THE INVENTION

Figure 1:
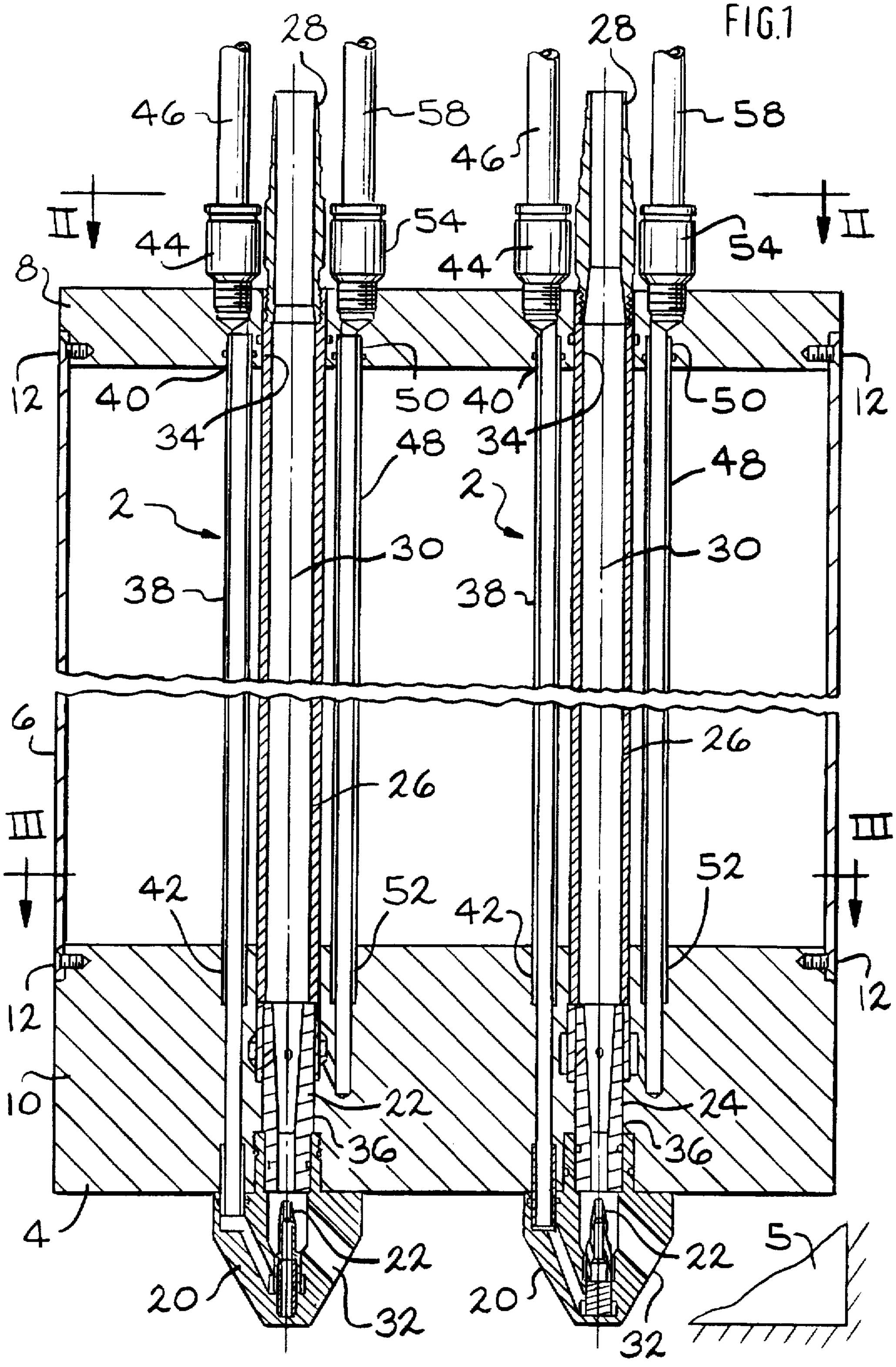
FIG. 1 is a fragmentary vertical cross section through a powder coating device according to the invention, with two powder feed devices arranged side by side.
Figure 2:
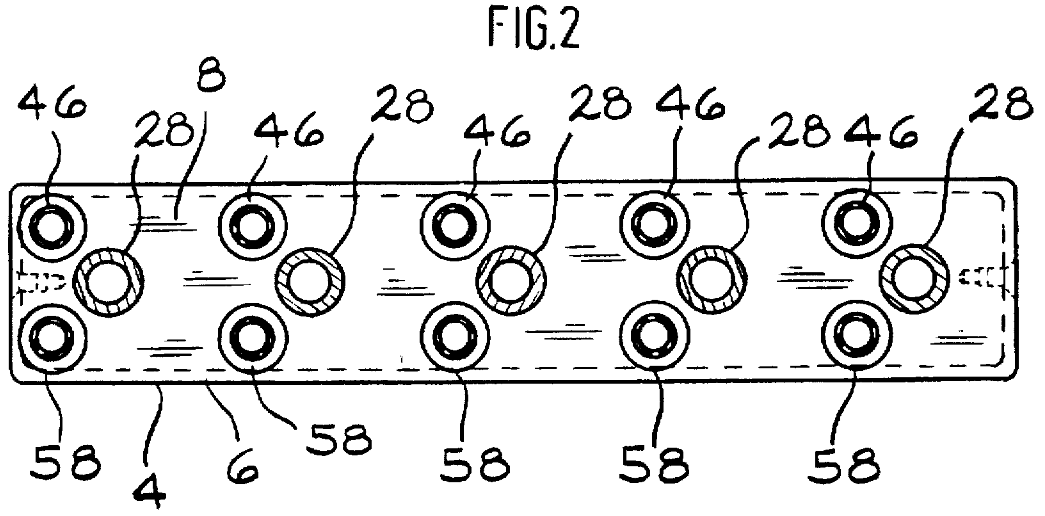
FIG. 2 is a cross-sectional view as taken along line II—II of FIG. 1.
Figure 3:
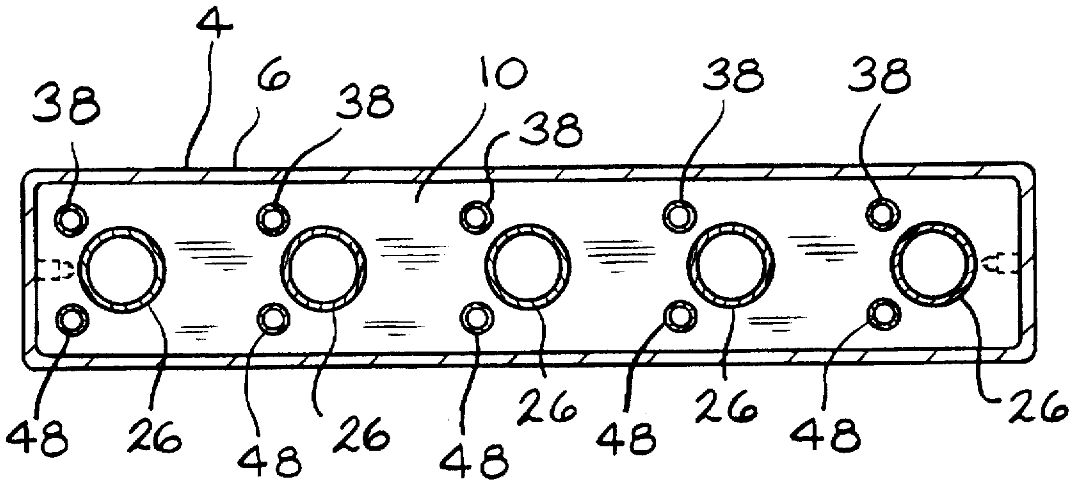
FIG. 3 is a cross-sectional view as taken along line III—III of FIG. 1.

The powder coating device of the invention illustrated in the drawing figures has a housing 4 with five powder feed devices 2 accommodated in it. The housing 4 also may be sized to accommodate more, for example ten, or fewer, powder feed devices 2 depending on the application requirements. The powder feed devices 2 are arranged parallel side by side and extend substantially across their entire length within the housing 4 in which they are mounted.

The housing 4 consists of a smooth housing wall 6 formed from a rectangular section pipe, a top mounting plate 8, and a bottom mounting plate 10. The mounting plates 8 and 10 are each detachably fastened to the housing wall 6 with screws 12. The two mounting plates 8 and 10 are preferably partly recessed in the tubular ends of the housing wall 6 so that their perimeter surfaces are mutually aligned. The flow paths of the powder feed devices 2 extend through the two mounting plates 8 and 10.

Each of the powder feed devices 2 is of identical design and has an intake head 20 with a replaceable injector nozzle 22 fitted in it, an injector tube 24 acting as injector collection nozzle, a powder tube 26 and a hose connecting sleeve 28, which in this order are axially arranged along a centerline, 30. The intake head 20 is removable secured to and protrudes downward out of the bottom mounting plate 10. The injector nozzle 22 is replaceable upon removal of the intake head 20 from the bottom mounting plate 10. A bore 32 in the intake head 20 serves as a powder suctioning inlet. The bore 32 extends obliquely relative to the centerline 30 through the intake head 20, from the outside of the intake head up into a chamber surrounding the injector nozzle 22. A compressed feed-air flow is discharged from the injector nozzle 22 into the injector tube 24. The feed-air flow creates a vacuum in the chamber, thereby suctioning powder out of a powder container 5 and through the powder suctioning inlet bore 32. The powder then flows with the air through the injector tube 24, the powder tube 26, and the hose connecting sleeve 28 to a point (not shown), for example, to a conventional spray device or to another container. Ends of the powder tube 26 are inserted in a powdertight arrangement in a through bore 34 in the top mounting plate 8 and in a through bore 36 in the bottom mounting plate 10. The injector tube 24 is inserted in the through bore 36 in the bottom mounting plate 10 and is disposed between the intake head 20, which is slipped over it, and the powder tube 26.

A compressed air tube 38 is mounted with its ends sealed to through bores 40 and 42 of the two mounting plates 8 and 10, respectively. The compressed air tube 38 is connected to a compressed air source (not shown) via a connecting sleeve 44 screwed from outside into the through bore 40, and to a hose 46, so as to feed compressed air to the injector nozzle 22. In a fashion similar to the compressed air tube 38, one or several additional compressed air tubes 48 may be inserted into and sealed to the bores 50 and 52 in the mounting plates 8 and 10, respectively, in order to feed supplemental air into the injector tube 24 and/or the vacuum chamber bordering on the injector nozzle 22, and in which the feed air flow from said injector nozzle 22 generates a vacuum. Supplemental air may be supplied to the further air tube 48 from the same or another compressed air source by way of a further connecting sleeve 54 and a further compressed air hose 58, through the bore 50 in the top mounting plate 8. It should be appreciated that hoses may be used instead of the tubes 26, 38, 48 and that tubes may be used instead of the hoses 46, 58.

In the illustrated exemplary embodiment, the injector, comprised substantially of the injector nozzle 22 and the injector tube 24, is located at the bottom and, hence, upstream end of the powder tube 26. According to modified exemplary embodiments (not shown), the injector may be disposed at the top, and thus downstream, end of the powder tube 26, similar to what is known from German published patent application Nos. DE-A 40 12 190 and DE-A 40 21 674 as well as European patent No. EP-B-0 184 994. In this modified form, the powder tube 26 serves as a riser tube or powder intake tube.

The housing 4 is powdertight and encloses all parts of the powder feed devices 2, except for their powder suctioning inlet 32 at the bottom end and except for their connecting components 28, 44, and 54 for connection of an external powder line and external compressed air lines.

The powder feed devices 2 are able to feed the powder to different spray devices or to other points, for example into a further container or in parallel to different containers.

The invention provides in all embodiments the advantage that two or more, for example five or ten or twenty, powder feed devices 2 can be immersed in a single powder container, jointly as a module, either manually or automatically, and that the powder feed devices 2 make on most of their outsides no contact with powder. At powder change, merely the outside of the housing 4 needs to be cleaned, but not the outsides of the individual powder feed devices 2. All parts of the powder feed devices 2 are joined to the mounting plates 8 and 10 in easily detachable manner, preferably by slip-on connection. To disassemble the entire device, only one of the two mounting plates 8 or 10 needs to be separated from the housing wall 6 for disassembly of the powder feed devices or, vice versa, for their assembly. In exchanging or cleaning an injector nozzle 22, only an intake head 20 needs to be removed from the bottom mounting plate 10.

It will be appreciated that various modifications and changes may be made to the above described preferred embodiment of a coating powder feed device without departing from the scope of the following claims.

What is claimed is:

1. A coating powder feed device comprising a housing sealed against entry of coating powder, and a plurality of powder conveying devices mounted in said housing, each of said powder conveying devices including an injector, a compressed air duct adapted for feeding compressed air to said injector, and a powder conduit adapted for conveying the powder when fluidized from the injector, wherein said injectors, said compressed air ducts, and said powder conduits are enclosed within said housing, and wherein each one of said powder conveying devices further includes an intake head projecting from said housing and defining a powder inlet connected to deliver the coating powder from exterior to said housing to the injector for said each one powder conveying device, whereby all of said powder conveying devices are mounted in said housing for simultaneous insertion into a source of the coating powder.

2. A coating powder feed device, as set forth in claim 1, and wherein said housing has a top, a bottom, and a side wall, and wherein said intake heads are mounted on said housing bottom.

3. A coating powder feed device, as set forth in claim 2, and wherein said housing top and bottom are each detachably secured to said side wall with a plurality of screws.

4. A coating powder feed device, as set forth in claim 2, and wherein the intake head for each one of said powder conveying devices is detachably secured to said bottom and retains the injector for said one powder conveying device in a passage in said bottom between the intake head and the powder conduit for said each one powder conveying device, whereby said injector for said each one powder conveying device can be replaced from outside said housing by removing the intake head which retains said injector for said each one powder conveying device.

5. A coating powder feed device, as set forth in claim 4, and wherein said powder conduit for each one of said powder conveying devices extends through said housing between said housing bottom and said housing top.

* * * * *